United States Patent
Yousef et al.

(10) Patent No.: US 12,194,433 B1
(45) Date of Patent: Jan. 14, 2025

(54) POLYIMIDE MEMBRANES INCORPORATING DISELENIDE FUNCTIONALITY FOR SELECTIVE SEPARATION OF $CO_2$

(71) Applicant: IMAM MOHAMMAD IBN SAUD ISLAMIC UNIVERSITY, Riyadh (SA)

(72) Inventors: Tarek Ahmed Yousef, Riyadh (SA); Saad Shaaban, Al-Ahsa (SA); Faisal Khuwayshan L Algethami, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/805,958

(22) Filed: Aug. 15, 2024

(51) Int. Cl.
| | |
|---|---|
| B01D 53/22 | (2006.01) |
| B01D 53/02 | (2006.01) |
| B01J 20/26 | (2006.01) |
| B01J 20/28 | (2006.01) |
| B01J 20/30 | (2006.01) |
| C08G 73/10 | (2006.01) |

(52) U.S. Cl.
CPC ............ *B01J 20/262* (2013.01); *B01D 53/02* (2013.01); *B01D 53/228* (2013.01); *B01J 20/28033* (2013.01); *B01J 20/3007* (2013.01); *B01J 20/3085* (2013.01); *C08G 73/1028* (2013.01); *C08G 73/1082* (2013.01); *B01D 2253/202* (2013.01); *B01D 2257/504* (2013.01)

(58) Field of Classification Search
CPC ........ B01D 53/02; B01D 53/04; B01D 53/22; B01D 53/228; B01D 2253/202; B01D 2257/504; B01J 20/262; B01J 20/28033; B01J 20/3007; B01J 20/3085; C08G 73/1028; C08G 73/1082
USPC .......................................... 95/45, 51; 96/4, 14
See application file for complete search history.

(56) References Cited

U.S. PATENT DOCUMENTS

| | | | | |
|---|---|---|---|---|
| 2011/0247360 | A1* | 10/2011 | Hasse ..................... | B01D 71/82 62/606 |
| 2011/0268618 | A1* | 11/2011 | Finkenrath ............. | B01D 53/62 96/9 |
| 2016/0001219 | A1* | 1/2016 | Ho ......................... | C10L 3/104 96/4 |

OTHER PUBLICATIONS

Andrzej Jankowski et al, "Polyimide-Based Membrane Materials for CO2 Separation: A Comparison of Segmented and Aromatic (Co)polyimides"; Membranes (Basel). Apr. 2021; 11(4): 274. Published online Apr. 8, 2021. doi: 10.3390/membranes11040274.

Clem E. Powell et al, "Reversible diamine cross-linking of polyimide membranes"; Journal of Membrane Science, vol. 291, Issues 1-2, Mar. 15, 2007, pp. 199-209.

Guining Chen et al, "Membrane materials targeting carbon capture and utilization"; Advanced Membranes, vol. 2, 2022, 100025.

Pei Shi Tin et al, "Separation of CO2/CH4 through carbon molecular sieve membranes derived from P84 polyimide"; Carbon, vol. 42, Issue 15, 2004, pp. 3123-3131.

(Continued)

*Primary Examiner* — Frank M Lawrence, Jr.
(74) *Attorney, Agent, or Firm* — Nath, Goldberg & Meyer; Joshua B. Goldberg

(57) ABSTRACT

Polyimide membranes including polyimide structures selected from the group including:

wherein n is an integral number where $2 \leq n \leq 100$, i.e., an integer between and including 2 and 100, or an integer between 2 and 100.

20 Claims, No Drawings

(56) References Cited

OTHER PUBLICATIONS

Young Hun Lee et al, "Controlled Synthesis of Metal-Organic Frameworks in Scalable Open-Porous Contactor for Maximizing Carbon Capture Efficiency"; ACS Au Jan. 8, 2021, 1198-1207, Publication Date: Jun. 21, 2021 https://doi.org/10.1021/jacsau.1c00068.

Hamidreza Sanaeepur et al, "Polyimides in membrane gas separation: Monomer's molecular design and structural engineering"; Progress in Polymer Science, vol. 91, Apr. 2019, pp. 80-125.

P.S. Goh et al, "Recent advances of inorganic fillers in mixed matrix membrane for gas separation"; Separation and Purification Technology, vol. 81, Issue 3, Oct. 10, 2011, pp. 243-264.

Dongyoung Kim et al, "Development of CO2-Selective Polyimide-Based Gas Separation Membranes Using Crown Ether and Polydimethylsiloxane"; Polymers (Basel). Jun. 2021; 13(12): 1927. Published online Jun. 10, 2021. doi: 10.3390/polym13121927.

M.G. Sribala et al, "Efficient catalytic activity of novel fluorescent polyimide embedded Ag and V2O5 nanoparticles towards the removal of hazardous pollutants"; Journal of Hazardous Materials, vol. 414, Jul. 15, 2021, 125606.

Qilong Li et al, "Selenide-Containing Polyimides with an Ultrahigh Intrinsic Refractive Index"; Polymers 2018, 10(4), 417; https://doi.org/10.3390/polym10040417.

\* cited by examiner

POLYIMIDE MEMBRANES INCORPORATING DISELENIDE FUNCTIONALITY FOR SELECTIVE SEPARATION OF CO₂

BACKGROUND

1. Field

The present disclosure relates to polyimide membranes incorporating diselenide functionality, their synthesis, and their use for selective separation of carbon dioxide ($CO_2$).

2. Description of the Related Art

Carbon dioxide ($CO_2$) capture and storage from power plants and industrial sources are rising technologies which aim to mitigate the change in climate while offering a zero-carbon economy via employing the stored $CO_2$ to manufacture other useful carbon-based products.

Most of the world's cities are subjected to serious issues arising from the amounts of $CO_2$ in their air and environment. Due to accelerated urbanization and population growth, these cities are vulnerable to high energy consumption, transportation demands, and industrial activities, which result in the liberation of large quantities of $CO_2$ and accompanying different environmental problems. Therefore, pollution is a main concern in these cities, resulting in persistent poor air quality. This poses risks to public health and the overall ecosystem.

For example, elevated levels of $CO_2$ can worsen respiratory problems, cardiovascular diseases, and contribute to global climate change. Furthermore, $CO_2$ can trap heat and lead to a rise in temperature, which in turn can change weather patterns and raise sea levels. While the development of membrane post combustion $CO_2$ capture is a prominent research area to address these challenges, much work is still required to obtain workable solutions.

Thus, new methods of absorbing $CO_2$ addressing the aforementioned problems are desired.

SUMMARY

The present subject matter relates to multifunctional polyimide membranes fabricated for the adsorption of $CO_2$. These multifunctional polyimide membranes can use different diamines, such as 2,2'-diselanediylbis(ethan-1-amine) (1) and 3,3'-diselanediylbis(propan-1-amine) (2), and/or different dianhydrides, such as pyromellitic dianhydride (3) and 3,4,9,10-perylenetetracarboxylic dianhydride (4).

In an embodiment, the present subject matter relates to polyimide membranes comprising one or more polyimide structures selected from the group consisting of:

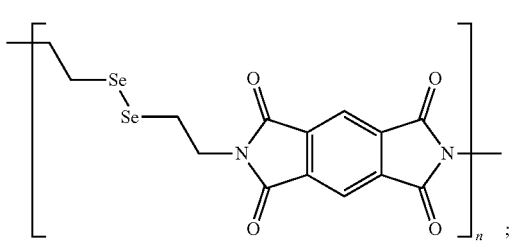

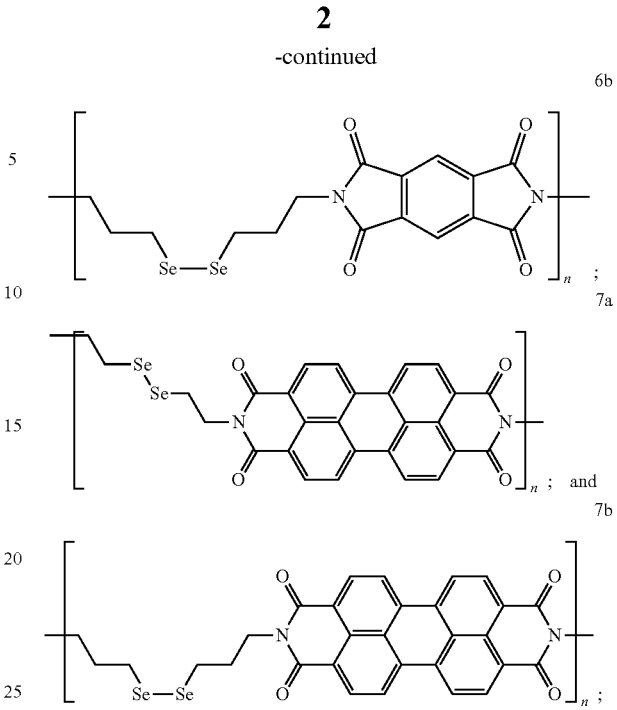

wherein n is an integral number where 2≤n≤100, i.e., an integer between and including 2 and 100, or an integer between 2 and 100.

In another embodiment, the present subject matter relates to a method of absorbing $CO_2$ using polyimide membranes.

In a further embodiment, the present subject matter relates to a method of making polyimide membranes. The method may include dissolving powder including polyimides in dimethylformamide (DMF) to obtain a casting solution; casting the casting solution onto a glass plate; heating the casting solution cast on the glass plate a first time for one day; heating the casting solution cast on the glass plate a second time for 6 hours; heating the casting solution cast on the cast plate a third time; and obtaining the polyimide membrane.

In one more embodiment, the present subject matter relates to a method of making a polyimide. The method may include mixing a diselenide diamine and N-methylpyrrolidine (NMP) under argon to form a first solution. The method may also include adding a dianhydride to the first solution to form a polyamic acid viscous mixture and stirring the polyamic acid viscous mixture at room temperature for at least about 12 hours. The method may also include adding N-methylpyrrolidine to the polyamic acid viscous mixture to form a mixture and attaching the mixture to a water condenser and Dean-stark trap. The method may further include heating the mixture to about 180° C. to about 190° C. for at least about 9 hours. The method may also include cooling the heated mixture to room temperature and adding cold methanol to obtain a precipitate. The method may also include filtering and washing the precipitate with hot methanol; and drying the precipitate to obtain the polyimide.

In certain embodiments, the diselenide diamine and the dianhydride may be added in a 1:1 molar ratio.

In some embodiments, the diselenide diamine may be 2,2'-diselanediylbis(ethan-1-amine), the dianhydride may be pyromellitic dianhydride, and the polyimide may be 2,2'-diselanediylbis(ethan-1-amine) pyromellitic dianhydride (6a).

In an embodiment, the diselenide diamine may be 3,3'-diselanediylbis(propan-1-amine), the dianhydride may be pyromellitic dianhydride, and the polyimide may be 3,3'-diselanediylbis(propan-1-amine) pyromellitic dianhydride.

In another embodiment, the diselenide diamine may be 2,2'-diselanediylbis(ethan-1-amine), the dianhydride may be 3,4,9,10-perylenetetracarboxylic dianhydride, and the polyimide may be 2,2'-diselanediylbis(ethan-1-amine) pyromellitic 3,4,9,10-perylenetetracarboxylic dianhydride (7a).

In a further embodiment, the diselenide diamine may be 3,3'-diselanediylbis(propan-1-amine), the dianhydride may be 3,4,9,10-perylenetetracarboxylic dianhydride, and the polyimide may be 3,3'-diselanediylbis(propan-1-amine) 3,4,9,10-perylenetetracarboxylic dianhydride (7b).

In another embodiment, the present subject matter relates to a method of adsorbing carbon dioxide ($CO_2$) comprising contacting carbon dioxide with a polyimide membrane as described herein; and adsorbing the carbon dioxide on the polyimide membrane.

These and other features of the present subject matter will become readily apparent upon further review of the following specification.

DETAILED DESCRIPTION OF THE
PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to multifunctional polyimide membranes fabricated for the adsorption of $CO_2$. In an embodiment, these polyimide membranes can be made using different diamines, such as 2,2'-diselanediylbis(ethan-1-amine) (1) and 3,3'-diselanediylbis(propan-1-amine) (2), and different dianhydrides, such as pyromellitic dianhydride (3) and 3,4,9,10-perylenetetracarboxylic dianhydride (4) as shown below:

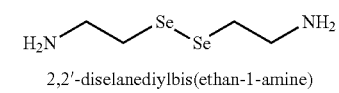

2,2'-diselanediylbis(ethan-1-amine)

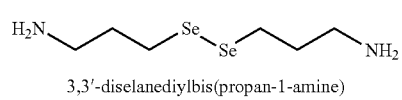

3,3'-diselanediylbis(propan-1-amine)

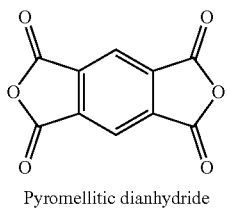

Pyromellitic dianhydride

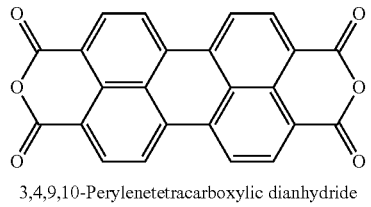

3,4,9,10-Perylenetetracarboxylic dianhydride

In an embodiment, the present subject matter relates to polyimide membranes comprising one or more polyimide structures selected from the group consisting of:

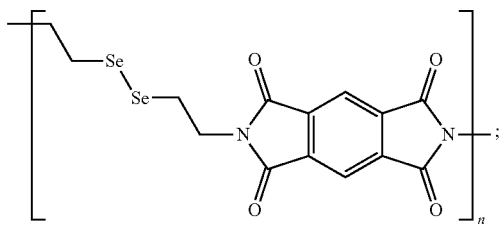

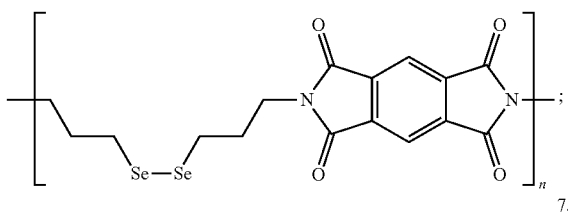

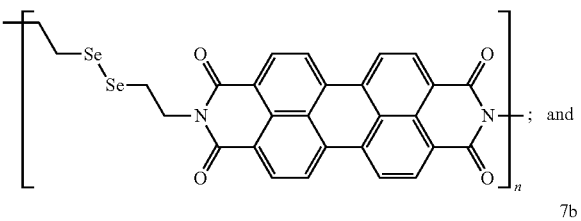

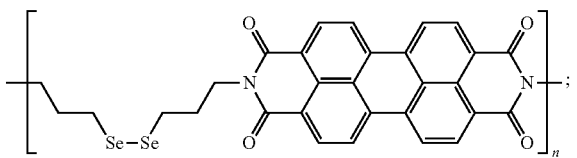

wherein n is an integral number where 2≤n≤100, i.e., an integer between and including 2 and 100, or an integer between 2 and 100.

Put another way, the present subject matter relates to polyimide membranes comprising polyimide structures selected from the group consisting of: 2,2'-diselanediylbis (ethan-1-amine) pyromellitic dianhydride (6a); 3,3'-disel- anediylbis(propan-1-amine) pyromellitic dianhydride (6b); 2,2'-diselanediylbis(ethan-1-amine) 3,4,9,10-perylenetetrac- arboxylic dianhydride (7a); 3,3'-diselanediylbis(propan-1- amine) 3,4,9,10-perylenetetracarboxylic dianhydride (7b); and combinations thereof.

In certain embodiments, the membranes may adsorb, or may be configured to adsorb, carbon dioxide ($CO_2$).

In another embodiment, the present subject matter relates to a method of making the polyimide membranes as described herein. The method may include dissolving powder comprising one or more polyimides in dimethylformamide (DMF) to obtain a casting solution; casting the casting solution onto a glass plate; heating the casting solution cast onto the glass plate a first time for about one day; heating the casting solution cast onto the glass plate a second time for about 6 hours; heating the casting solution cast onto the glass plate a third time; and obtaining the polyimide membrane. In various embodiments, one day may include at least about 24 hours, about 24 hours, or 24 hours.

In a further embodiment, the powder may be 20 wt % polyimide.

In another embodiment, 5 mL of DMF may be used to dissolve the powder.

In an embodiment, the heating of the casting solution case onto the glass plate each of the first time, the second time, and the third time occur at different temperatures. In certain embodiments in this regard, the heating at each of the first time, the second, and the third time may occur at progressively increasing temperatures.

In certain embodiments, heating the casting solution cast on the glass plate a first time may occur at temperature of at least about 60° C., about 60° C., or 60° C. In other embodiments, heating the casting solution cast on the glass plate a second time may occur at a temperature of at least about 100° C., about 100° C., or 100° C. In still further embodiments, heating the casting solution cast on the glass plate a third time may occur at a temperature of at least about 150° C., about 150° C., or 150° C.

In one more embodiment, the present subject matter relates to a method of making a polyimide, the method including: mixing a diselenide diamine and N-methylpyrrolidone or 1-methylpyrrolidin-2-one (NMP), having the below structure, under argon to form a first solution. The method may also include adding a dianhydride to the first solution to form a polyamic acid viscous mixture and stirring the polyamic acid viscous mixture at room temperature for at least about 12 hours, about 12 hours, or 12 hours. The method may also include adding N-methylpyrrolidine to the polyamic acid viscous mixture to form a mixture and attaching the mixture to a water condenser and Dean-stark trap. The method may further include heating the mixture to about 180° C. to about 190° C., or 180° C. to 190° C., for at least about 9 hours, about 9 hours, or 9 hours. The method may also include cooling the heated mixture to room temperature and adding cold methanol thereto to obtain a precipitate. The method may then include filtering and washing the precipitate with hot methanol and drying the precipitate to obtain the polyimide.

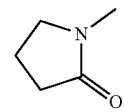

N-Methylpyrrolidone
1-methylpyrrolidin-2-one

The present production methods can be further seen by referring to the following Scheme 1:

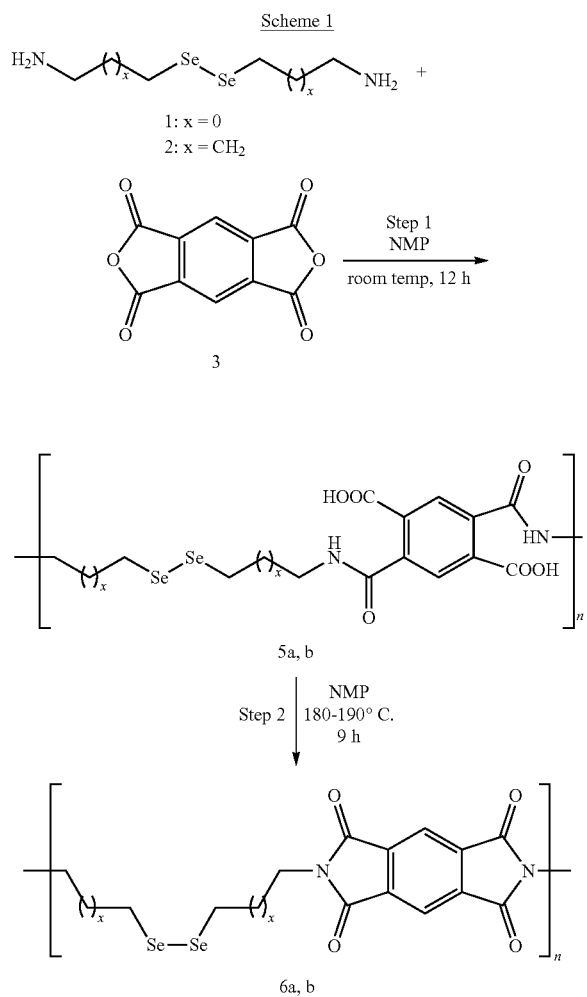

In an embodiment of the present production methods, the diselenide diamine may be 3,3'-diselanediylbis(propan-1-amine), the dianhydride may be pyromellitic dianhydride, and the polyimide may be 3,3'-diselanediylbis(propan-1-amine) pyromellitic dianhydride.

Put another way, an embodiment of the present production methods can be further seen by referring to the following Scheme 2:

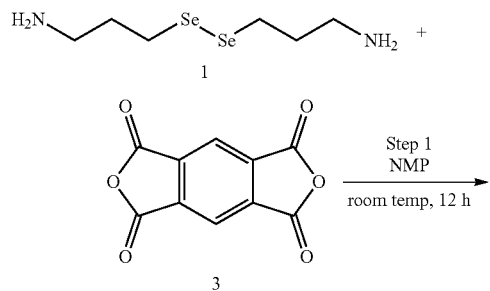

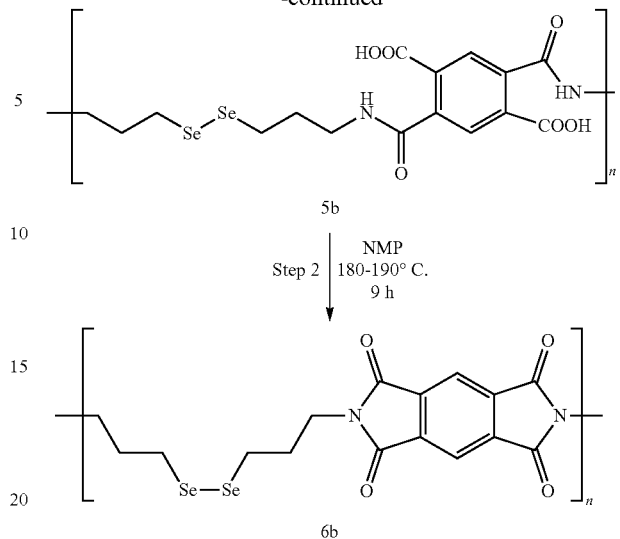

In another embodiment, the present subject matter relates to a method of adsorbing carbon dioxide ($CO_2$) comprising contacting carbon dioxide with a polyimide membrane as described herein; and adsorbing the carbon dioxide on the polyimide membrane.

The following examples relate to various methods of manufacturing the specific compounds and application of the same, as described herein. All compound numbers expressed herein are with reference to the synthetic pathway figures shown above.

EXAMPLES

Example 1

Synthesis of Polyimides

Under argon, diselenide diamine (5 mmol) and N-methylpyrrolidine (NMP) (12 mL) were mixed until a clear solution and the complete dissolution of the diamine were observed. After that, dianhydride (3) (5 mmol) was added. The solution was stirred at room ambient temperature for 12 hours overnight. After that, N-methylpyrrolidine (12 mL) was then added to the formed polyamic acid viscous mixture and the reaction mixture was attached to a water condenser and Dean-Stark trap. The reaction mixture was heated to 180-190° C. for 9 h. The reaction mixture was cooled to room temperature and cold methanol was carefully and gradually added. The formed precipitate was filtered and washed with hot methanol and dried at 100° C. for 12 hours.

Example 2

Synthesis of 6b

Under argon, 3,3'-diselanediylbis(propan-1-amine) (2) (5 mmol) and N-methylpyrrolidine (NMP) (12 mL) were mixed until a clear solution and the complete dissolution of the diamine were observed. After that, pyromellitic dianhydride (3) (5 mmol) was added. The solution was stirred at room ambient temperature for 12 hours overnight. After that, N-methylpyrrolidine (NMP) (12 mL) was added to the formed polyamic acid viscous mixture and the reaction mixture was attached to a water condenser and Dean-Stark trap. The reaction mixture was heated to 180-190° C. for 9 hours. The reaction mixture was cooled to room temperature and cold methanol was carefully and gradually added. The formed precipitate was filtered and washed with hot methanol and dried at 100° C. for 12 hours.

Example 3

Membrane Fabrication

Polyimide membranes were prepared by dissolving the polyimide powders (20 wt %) in (dimethylformamide) DMF (5 mL) as a casting solution. The casting solutions were cast onto glass plates and heated at 60° C. for one day, then at 100° C. for 6 h, and finally at 150° C. for another one day. The polyimide membrane was then separated from the glass plates and obtained for further use.

It is to be understood that the polyimide membranes incorporating diselenide functionality, compositions containing the same, and methods of using and producing the same are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A polyimide membrane comprising one or more polyimide structures selected from the group consisting of:

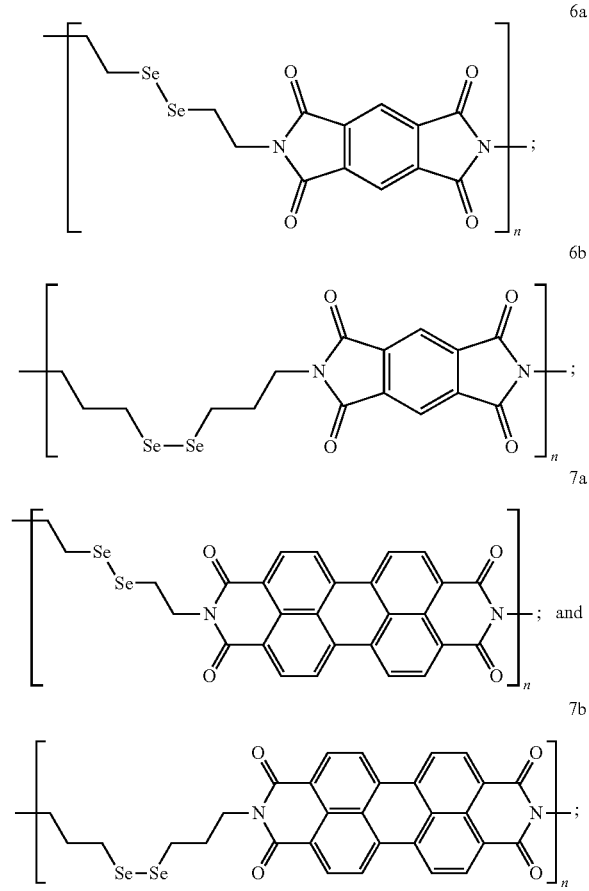

wherein n is an integral number where 2≤n≤100.

2. The polyimide membrane of claim 1, wherein the membrane is configured to adsorb carbon dioxide ($CO_2$).

3. A method of making the polyimide membrane of claim 1, the method comprising:
dissolving powder comprising a polyimide in dimethylformamide (DMF) to obtain a casting solution;
casting the casting solution onto a glass plate;
heating the casting solution cast onto the glass plate a first time for about one day;
heating the casting solution cast onto the glass plate a second time for about 6 hours;
heating the casting solution cast onto the glass plate a third time; and
obtaining the polyimide membrane.

4. The method of claim 3, wherein the powder is 20 wt % polyimide.

5. The method of claim 3, wherein 5 mL of the DMF is used to dissolve the powder.

6. The method of claim 3, wherein heating the casting solution cast onto the glass plate the first time is at a temperature of about 60° C.

7. The method of claim 3, wherein heating the casting solution cast onto the glass plate the second time is at a temperature of about 100° C.

8. The method of claim 3, wherein heating the casting solution cast onto the glass plate the third time is at a temperature of about 150° C.

9. A method of making a polyimide, the method comprising:
mixing a diselenide diamine and N-methylpyrrolidine (NMP) under argon to form a first solution;
adding a dianhydride to the first solution to form a polyamic acid viscous mixture;
stirring the polyamic acid viscous mixture at room temperature for at least about 12 hours;
adding N-methylpyrrolidine to the polyamic acid viscous mixture to form a mixture;
attaching the mixture to a water condenser and Dean-stark trap;
heating the mixture to about 180° C. to about 190° C. for at least about 9 hours;
cooling the heated mixture to room temperature;
adding cold methanol to the cooled mixture to obtain a precipitate;
filtering and washing the precipitate with hot methanol; and
drying the precipitate to obtain the polyimide.

10. The method of making the polyimide of claim 9, wherein the diselenide diamine and the dianhydride are added in a 1:1 molar ratio.

11. The method of making the polyimide of claim 9, wherein the diselenide diamine is 2,2'-diselanediylbis(ethan-1-amine), the dianhydride is pyromellitic dianhydride, and the polyimide is 2,2'-diselanediylbis(ethan-1-amine) pyromellitic dianhydride (6a).

12. The method of making the polyimide of claim 9, wherein the diselenide diamine is 3,3'-diselanediylbis(propan-1-amine), the dianhydride is pyromellitic dianhydride, and the polyimide is 3,3'-diselanediylbis(propan-1-amine) pyromellitic dianhydride (6b).

13. The method of making the polyimide of claim 9, wherein the diselenide diamine is 2,2'-diselanediylbis(ethan-1-amine), the dianhydride is 3,4,9,10-perylenetetracarboxylic dianhydride, and the polyimide is 2,2'-diselanediylbis(ethan-1-amine) pyromellitic 3,4,9,10-perylenetetracarboxylic dianhydride (7a).

14. The method of making the polyimide of claim 9, wherein the diselenide diamine is 3,3'-diselanediylbis(propan-1-amine), the dianhydride is 3,4,9,10-perylenetetracarboxylic dianhydride, and the polyimide is 3,3'-diselanediyl-bis(propan-1-amine) 3,4,9,10-perylenetetracarboxylic dianhydride (7b).

15. A method of making a polyimide membrane, the method comprising:
   dissolving the polyimide obtained from the method of claim 9 in 5 mL DMF to form a casting solution;
   casting the casting solution onto a glass plate;
   heating the casting solution cast onto the glass plate a first time for about one day;
   heating the casting solution cast onto the glass plate a second time for 6 hours; and
   heating the casting solution cast onto the glass plate a third time for a second day.

16. The method of claim 15, wherein the powder is 20 wt % polyimide.

17. The method of claim 15, wherein heating the casting solution cast onto the glass plate a first time is at a temperature of about 60° C.

18. The method of claim 15, wherein heating the casting solution cast onto the glass plate a second time is at a temperature of about 100° C.

19. The method of claim 15, wherein heating the casting solution cast onto the glass plate a third time is at a temperature of about 150° C.

20. A method of adsorbing carbon dioxide ($CO_2$) comprising contacting carbon dioxide with the polyimide membrane of claim 1; and
   adsorbing the carbon dioxide on the polyimide membrane.

\* \* \* \* \*